US008370883B2

(12) United States Patent
Son et al.

(10) Patent No.: US 8,370,883 B2
(45) Date of Patent: *Feb. 5, 2013

(54) SECURE DISTRIBUTION OF VIDEO ON-DEMAND

(75) Inventors: Yong Ho Son, Palo Alto, CA (US); Christopher Goode, Menlo Park, CA (US)

(73) Assignee: Comcast IP Holdings I, LLC, Wilmington, DE (US)

(*) Notice: Subject to any disclaimer, the term of this patent is extended or adjusted under 35 U.S.C. 154(b) by 111 days.

This patent is subject to a terminal disclaimer.

(21) Appl. No.: 13/071,973

(22) Filed: Mar. 25, 2011

(65) Prior Publication Data

US 2011/0185380 A1 Jul. 28, 2011

Related U.S. Application Data

(63) Continuation of application No. 10/695,277, filed on Oct. 28, 2003, now Pat. No. 7,930,724, which is a continuation of application No. 09/850,231, filed on May 7, 2001, now Pat. No. 6,681,326, which is a continuation of application No. 09/267,800, filed on Mar. 12, 1999, now Pat. No. 6,229,895.

(51) Int. Cl.
  *H04N 7/18* (2006.01)
  *H04N 7/167* (2011.01)
(52) U.S. Cl. .................. 725/87; 725/86; 725/31
(58) Field of Classification Search .................. None
  See application file for complete search history.

(56) References Cited

U.S. PATENT DOCUMENTS

| 4,890,319 A | 12/1989 | Seth-Smith et al. |
| 5,115,467 A | 5/1992 | Esserman et al. |
| 5,132,992 A | 7/1992 | Yurt et al. |
| 5,420,866 A | 5/1995 | Wasilewski |
| 5,504,816 A | 4/1996 | Hamilton et al. |
| 5,557,346 A | 9/1996 | Lipner et al. |
| 5,649,283 A | 7/1997 | Galler et al. |
| 5,666,487 A | 9/1997 | Goodman et al. |
| 5,675,647 A | 10/1997 | Garneau et al. |
| 5,721,778 A | 2/1998 | Kubota et al. |
| 5,758,257 A | 5/1998 | Herz et al. |
| 5,801,781 A | 9/1998 | Hiroshima et al. |

(Continued)

FOREIGN PATENT DOCUMENTS

| EP | 0674440 A2 | 3/1995 |
| EP | 0673578 B1 | 3/1999 |

(Continued)

OTHER PUBLICATIONS

Milnoli, Daniel, Video Dialtone Technology, McGraw-Hill, Inc., 1995, pp. 433 & 435-437.

(Continued)

*Primary Examiner* — Brian Pendleton
*Assistant Examiner* — Jean D Saint Cyr
(74) *Attorney, Agent, or Firm* — Banner & Witcoff, Ltd.

(57) ABSTRACT

An interactive information distribution system for providing secure distribution of video-on-demand content. The interactive information distribution system includes at least one programming source for storing at least one partially encrypted video program, and a distribution center including a remote server. The remote server stores the at least one partially encrypted video program received from the at least one programming source. The remote server also processes the partially encrypted video program corresponding to a subscriber requested video program to produce a fully encrypted video program. A subscriber-side distribution network, coupled to the distribution center, causes transmission of the fully encrypted video program to the requesting subscriber.

20 Claims, 8 Drawing Sheets

U.S. PATENT DOCUMENTS

| | | | |
|---|---|---|---|
| 5,838,792 A | | 11/1998 | Ganesan |
| 5,999,629 A | * | 12/1999 | Heer et al. .................. 705/51 |
| 6,055,314 A | | 4/2000 | Spies et al. |
| 6,151,675 A | * | 11/2000 | Smith ..................... 713/153 |
| 6,184,878 B1 | | 2/2001 | Alonso et al. |
| 6,289,314 B1 | * | 9/2001 | Matsuzaki et al. ............ 705/50 |
| 6,424,717 B1 | | 7/2002 | Pinder et al. |
| 6,434,535 B1 | * | 8/2002 | Kupka et al. ................ 705/24 |
| 7,137,025 B2 | | 11/2006 | Ito et al. |
| 7,301,944 B1 | * | 11/2007 | Redmond ................. 370/390 |
| 2003/0221113 A1 | | 11/2003 | Kupka et al. |

FOREIGN PATENT DOCUMENTS

WO        99/16244 A1     4/1999

OTHER PUBLICATIONS

Wayner, Peter, Digital Cash: Commerce on the Net, AP Professional, 1996, pp. 19-23.

Canadian Patent Application No. 2674148—Examiner's Report dated Dec. 10, 2009.

International Application No. PCT/US00/09045—International Search Report dated Oct. 13, 2000.

Canadian Application No. 2,674,148—Office Action dated Nov. 1, 2010.

Canadian Application No. 2,674,148—Notice of Allowance dated Oct. 11, 2011.

* cited by examiner

SECURE DISTRIBUTION OF VIDEO ON-DEMAND

CROSS REFERENCE TO RELATED APPLICATIONS

The present application is a CONTINUATION of and claims priority to application Ser. No. 10/695,277, filed Oct. 28, 2003 (now U.S. Pat. No. 7,930,724), and titled "SECURE DISTRIBUTION OF VIDEO ON-DEMAND", which is a CONTINUATION of U.S. patent application Ser. No. 09/850,231, filed May 7, 2001 (now U.S. Pat. No. 6,681,326), which is also a CONTINUATION of U.S. patent application Ser. No. 09/267,800, filed on Mar. 12, 1999 (now U.S. Pat. No. 6,229,895). The above identified applications and patents are incorporated by reference in their entirety.

BACKGROUND OF THE INVENTION

1. Field of the Invention

This invention relates generally to the field of video distribution networks. In particular, this invention relates to secure video distribution networks.

2. Description of the Background Art

Security is an important issue for video distribution networks. For cable distribution networks, there are various portions or locations where security is of concern.

A first portion where security is of concern is the primary distribution network. The primary distribution network is where video content is transferred from television studios to distribution centers. A second portion where security is of concern is the secondary distribution network. The secondary distribution network is where the video content is transmitted from a distribution center to subscriber stations.

For video on-demand distribution networks, there is an additional point where security is of concern. That point is a remote server within a distribution center. Typically, such a remote server stores the video content before the video content is distributed to the subscriber stations.

SUMMARY OF THE INVENTION

The present invention provides a solution to the security issues presented above, especially with regards to security at a remote server. In accordance with a first aspect of the invention, an interactive information distribution system provides secure distribution of video-on-demand content. The interactive information distribution system includes at least one programming source for storing at least one partially encrypted video program, and a distribution center including a remote server.

The remote server stores the at least one partially encrypted video program received from the at least one programming source. The remote server also processes the partially encrypted video program corresponding to a subscriber requested video program to produce a fully encrypted video program. A subscriber-side distribution network, coupled to the distribution center, causes transmission of the fully encrypted video program to the requesting subscriber.

DETAILED DESCRIPTION OF THE PREFERRED EMBODIMENTS

Figure 1:
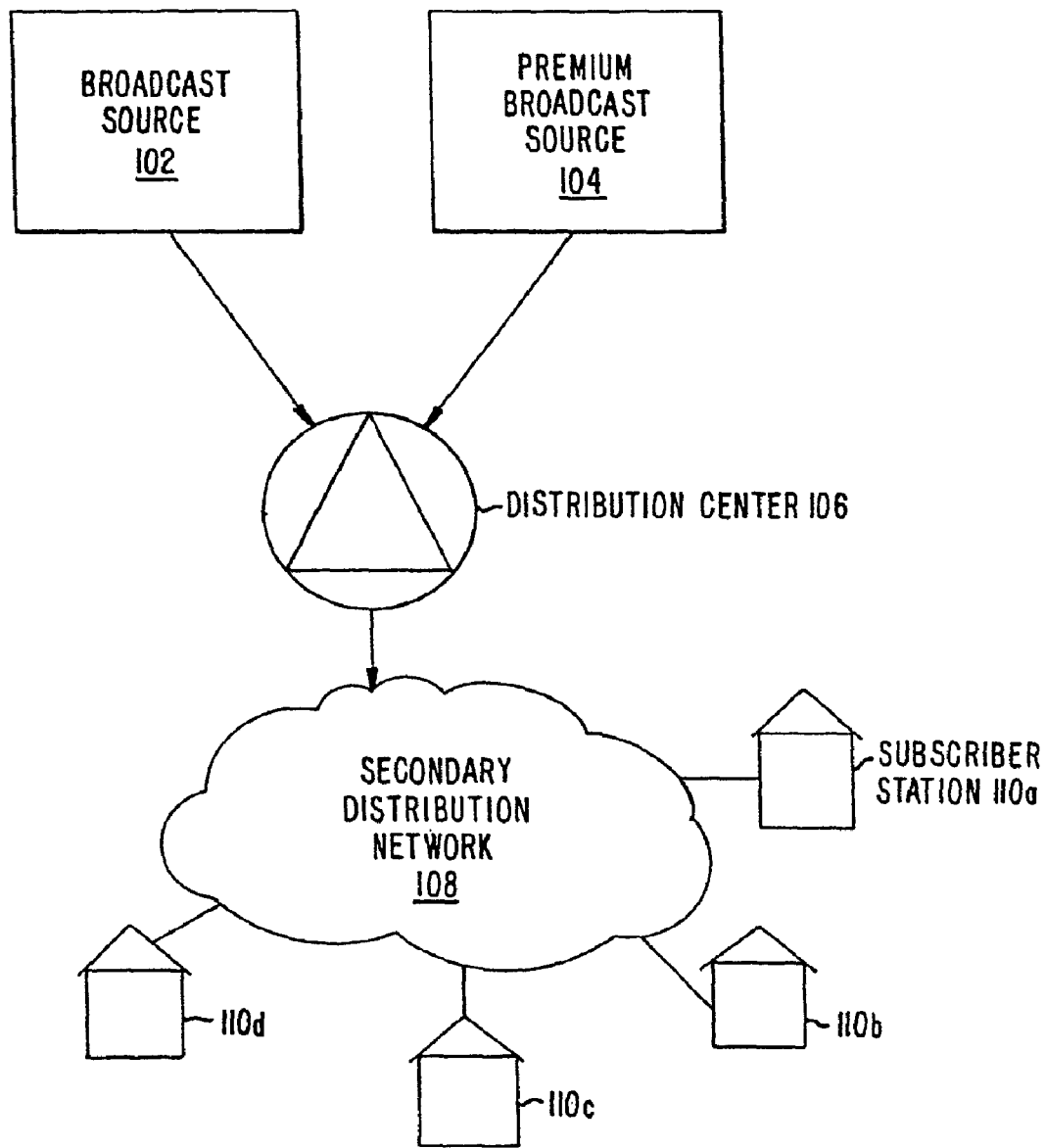
FIG. 1 is a schematic diagram of a conventional cable distribution network.

FIG. 1 is a schematic diagram of a conventional cable distribution network. The conventional cable distribution network typically includes one or more broadcast sources 102, one or more premium broadcast sources 104, one or more distribution centers 106, one or more secondary distribution networks 108, and a plurality of subscriber stations 110.

The broadcast source 102 may be, for example, a local television station. For instance, an affiliate station of a major network such as ABC, NBC, CBS, FOX, or UPN. The premium broadcast source 104 may be, for example, a premium channel such as HBO, Showtime, Cinemax, and so on. The sources 102 and 104 may be coupled via a primary distribution network to the distribution center 106. The distribution center 106 may be, for example, a cable head-end. The distribution center 106 may be coupled via a secondary distribution network 108 to the subscriber stations 110. The secondary distribution network 108 comprises may include, for example, various amplifiers, bridges, taps, and drop cables. Finally, the subscriber stations 110 may be, for example, set-top boxes and associated television equipment for viewing the video content by end users.

Figure 2:
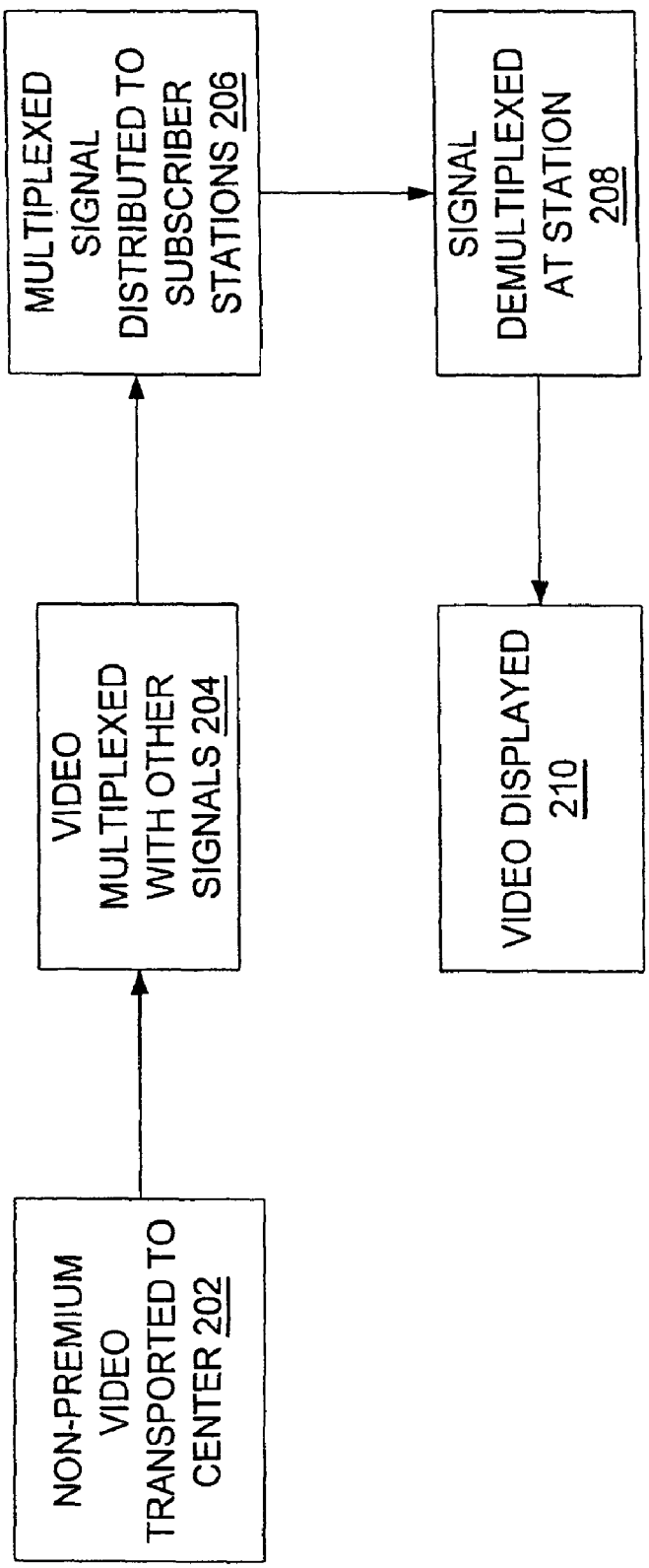
FIG. 2 is a flow chart depicting a conventional insecure process for distributing video content via a conventional cable distribution network.

FIG. 2 is a flow chart depicting a conventional insecure process for distributing video content via a conventional cable distribution network. First, a non-premium video signal is transported 202 from the broadcast source 102 to the distribution center 106. At the distribution center 106, the video signal is multiplexed 204 with other signals to generate a multiplexed signal. The multiplexed signal is then distributed 206 from the distribution center 106 via the secondary distribution network 108 to the subscriber stations 110. At the subscriber stations 110, the multiplexed signal is demultiplexed 208 to isolate the video signal, and then the video signal is displayed 210, typically, on a television monitor.

Figure 3:
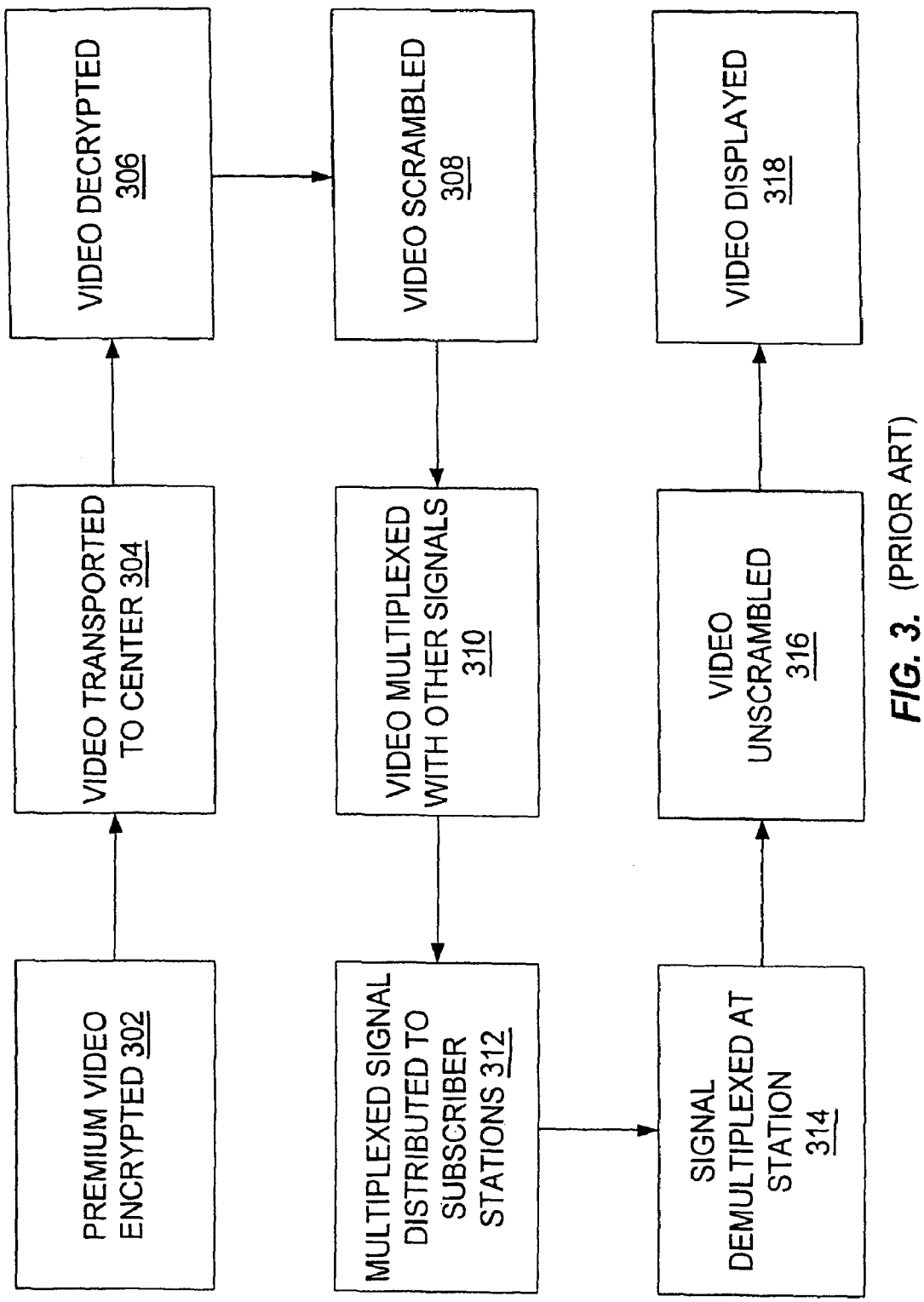
FIG. 3 is a flow chart depicting a conventional (somewhat) secure process for distributing video content via a conventional cable distribution network.

FIG. 3 is a flow chart depicting a conventional (somewhat) secure process for distributing video content via a conventional cable distribution network. First, a premium video signal is encrypted 302 to generate an encrypted signal. The encrypted signal is transported 304 from the premium broadcast source 104 to the distribution center 106.

At the distribution center 106, the video signal is decrypted 306 to regenerate the premium video signal. The premium video signal is then scrambled 308 and multiplexed 310 with other signals to generate a multiplexed signal. The multiplexed signal is then distributed 312 from the distribution center 106 via the secondary distribution network 108 to the subscriber stations 110.

At the subscriber stations 110, the multiplexed signal is demultiplexed 314 to isolate the scrambled video signal, the scrambled video signal is unscrambled 316, and then the video signal is displayed 318, typically, on a television monitor connected to a set-top box. The process in FIG. 3 is a typical conventional process for delivering premium video using scrambling. Other conventional processes also exist.

Figure 4:
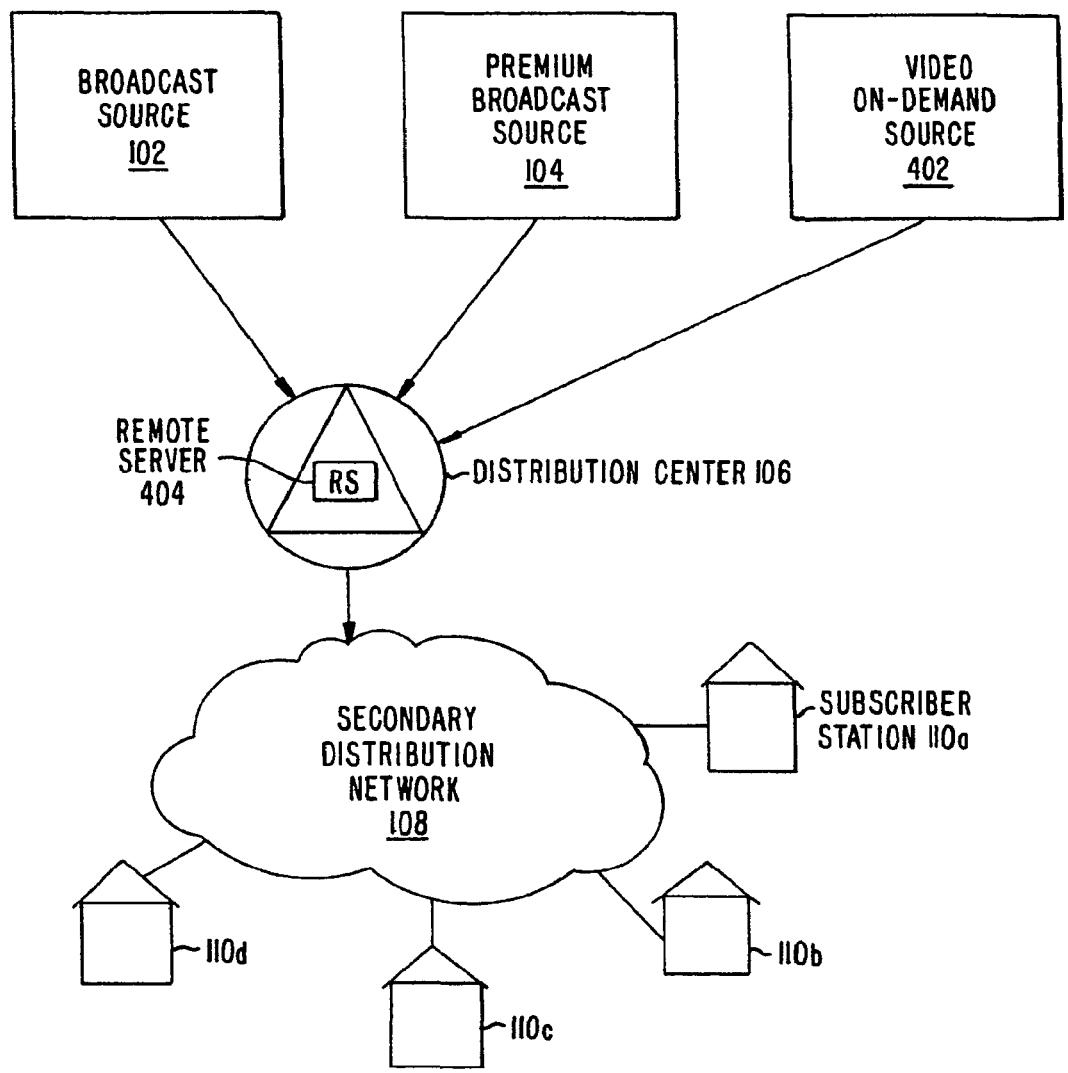
FIG. 4 is a schematic diagram of a cable distribution network including a video on-demand source in accordance with a preferred embodiment of the present invention.

FIG. 4 is a schematic diagram of a cable distribution network including a video on-demand source in accordance with a preferred embodiment of the present invention. In addition to the components of the conventional cable distribution network shown in FIG. 1, the cable distribution network shown in FIG. 4 includes a video on-demand source 402 and a remote server 404. The video on-demand source 402 may house, for example, a collection of video programs such as, for example, movies. As shown in FIG. 4, the remote server 404 may be located within the distribution center 106. The remote server 404 may include, for example, a parallel processing computer configured to be a video server, a disk drive array to store video data, and a video session manager to provide session control of the video data flowing to and from the video server.

Figure 5A:
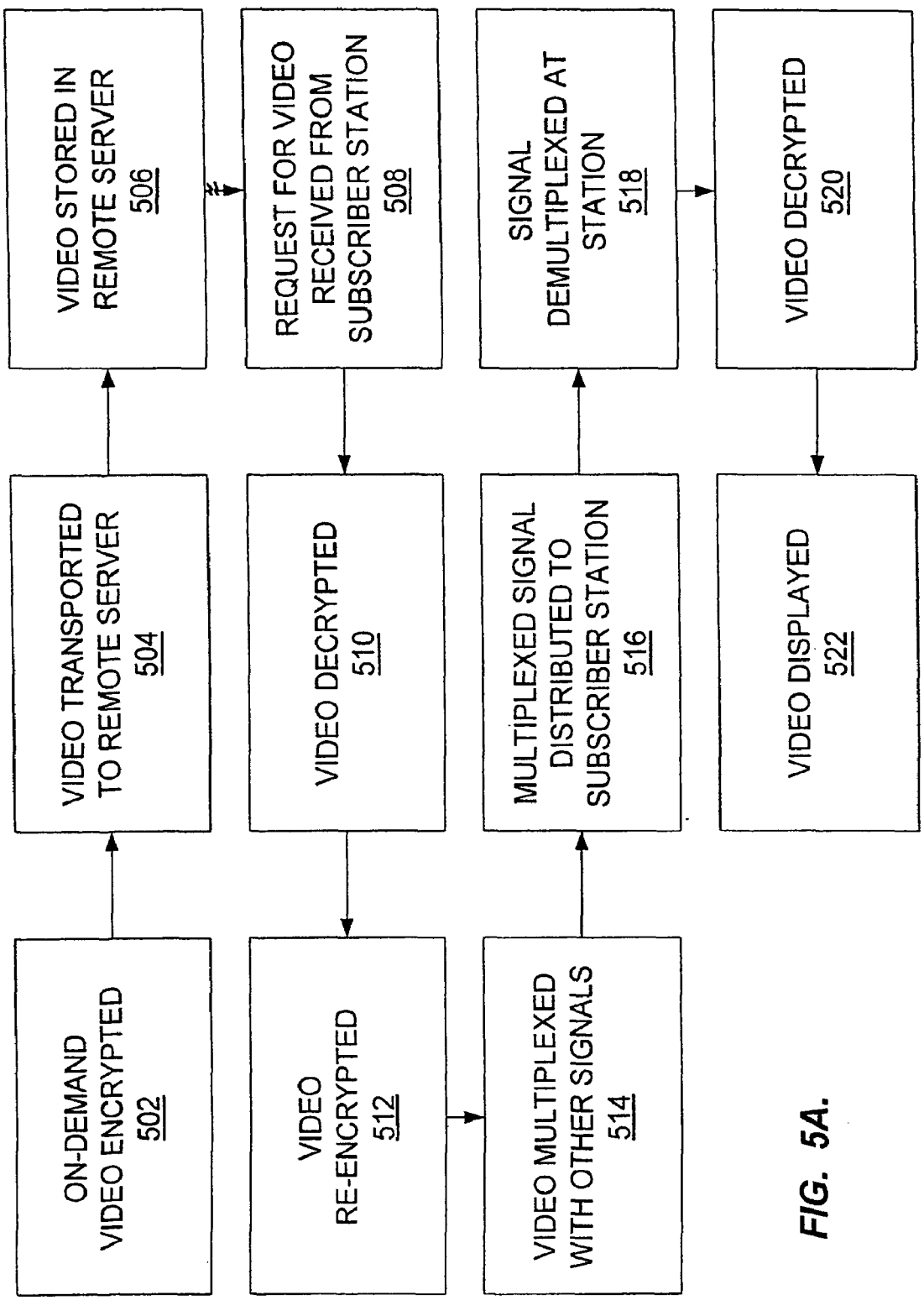
FIG. 5A is a flow chart depicting a secure process for distributing video on-demand content via a cable distribution network in accordance with a first aspect of the present invention.

FIG. 5A is a flow chart depicting a secure process for distributing video on-demand content via a cable distribution network in accordance with a first aspect of the present invention. The process depicted in FIG. 5A may be called a store, decrypt, and re-encrypt process.

First, a video program is encrypted 502 by a video on-demand source 402 to generate an encrypted program in a first encrypted form. The encrypted program is transported 504 via a primary distribution network from the video on-demand source 402 to a remote server 404 within a distribution center 106. The encrypted program is then stored 506 in the remote server 404.

Subsequently, when the remote server 404 receives 508 a request for transmission of the video program from a subscriber station 110, the remote server 404 responds by first decrypting 510 the video program from the first encrypted form. A first key is may be used to accomplish such decryption 510, and such key may have been received from the video on-demand source 402 via a communication channel that is separate from the one used to transmit the video program. After the video program is decrypted 510, the remote server 404 re-encrypts 512 the video program into a second encrypted form using a second key.

The second key may be a public key of a public key encryption system. Such a public key encryption system uses two different key: a public key to encrypt data and a private key to decrypt data. In that case, decryption would be accomplished using a corresponding private key of the public key encryption system. Examples of such a public key encryption system are encryption under the PGP (Pretty Good Privacy) system or under the RSA (Rivest, Shamir, and Adleman) system. Alternatively, the second key may be a private key of a private key encryption system. Such a private key encryption system uses a single private key to encrypt and decrypt data. Examples of such a private key encryption system are encryption under the Data Encryption Standard (DES) or under triple-DES which involves applying DES three times to enhance security. The private key(s) itself may be transmitted from the remote server 404 to the subscriber station 110 while encrypted in a third encrypted form.

After the video program is re-encrypted 512, the re-encrypted program in the second encrypted form (and the second key if necessary) is multiplexed 514 with other signals to generate a multiplexed signal. The multiplexed signal is then distributed 516 via the secondary distribution network 108 to the subscriber stations 110.

At the subscriber stations 110, the multiplexed signal is demultiplexed 518 to isolate the re-encrypted program in the second encrypted form (and the second key if necessary), the re-encrypted program is decrypted 520 from the second encrypted form to generate the unencrypted video program, and then the video program is displayed 522, typically, on a television monitor connected to set-top box.

Figure 5B:
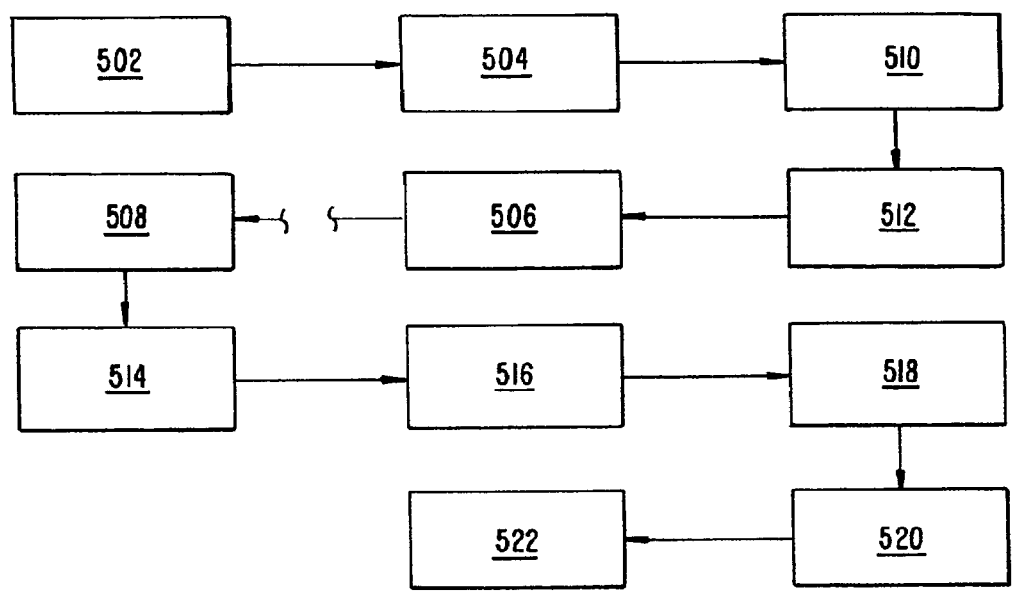
FIG. 5B is a flow chart depicting a secure process for distributing video on-demand content via a cable distribution network in accordance with a second aspect of the present invention.

FIG. 5B is a flow chart depicting a secure process for distributing video on-demand content via a cable distribution network in accordance with a second aspect of the present invention. The process depicted in FIG. 5B may be called a decrypt, re-encrypt, and store process. In comparison with the process in FIG. 5A, the process in FIG. 5B decrypts 510 and re-encrypts 512 the video program before the video program is stored 506 in the remote server 404.

First, a video program is encrypted 502 by a video on-demand source 402 to generate an encrypted program in a first encrypted form. The encrypted program is transported 504 via a primary distribution network from the video on-demand source 402 to a remote server 404 within a distribution center 106. At this point, the remote server 510 decrypts 510 the video program from the first encrypted form. A first key is may be used to accomplish such decryption 510, and such key may have been received from the video on-demand source 402 via a communication channel that is separate from the one used to transmit the video program. After the video program is decrypted 510, the remote server 404 re-encrypts 512 the video program into a second encrypted form using a second key. After the decryption 510 and re-encryption 512, the re-encrypted program is then stored 506 in the remote server 404.

Note that step 506 in FIG. 5B differs from step 506 in FIG. 5A in that step 506 in FIG. 5B involves storing the video program in the second encrypted form while step 506 in FIG. 5A involves storing the video program in the first encrypted form.

Subsequently, when the remote server 404 receives 508 a request for transmission of the video program from a subscriber station 110, the remote server 404 responds by multiplexing 514 the re-encrypted program in the second encrypted form (and the second key if necessary) with other signals to generate a multiplexed signal. The multiplexed signal is then distributed 516 via the secondary distribution network 108 to the requesting subscriber station 110.

At the subscriber stations 110, the multiplexed signal is demultiplexed 518 to isolate the re-encrypted program in the second encrypted form (and the second key if necessary), the re-encrypted program is decrypted 520 from the second encrypted form to generate the unencrypted video program, and then the video program is displayed 522, typically, on a television monitor connected to set-top box.

Figure 6:
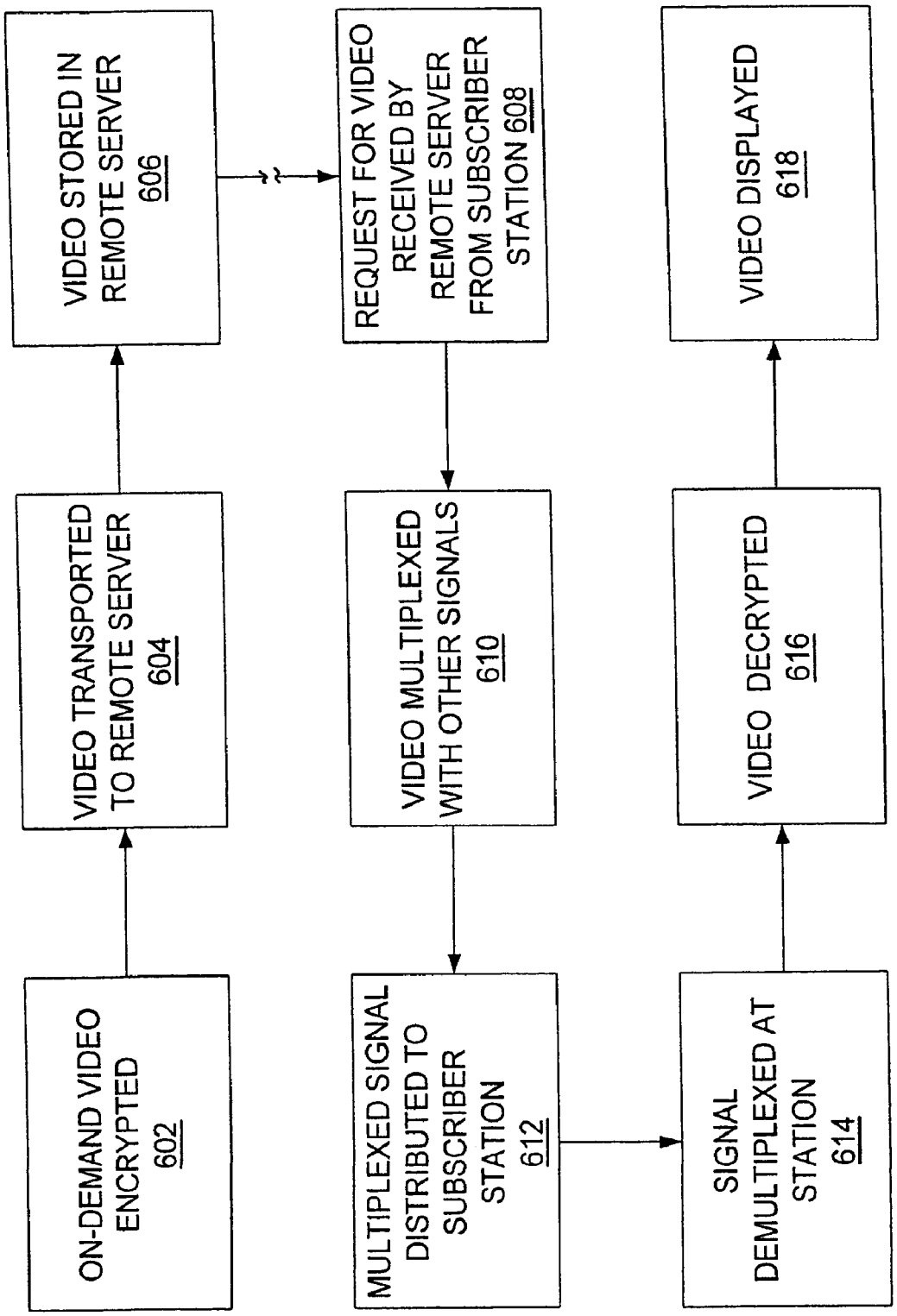
FIG. 6 is a flow chart depicting a secure process for distributing video on-demand content via a cable distribution network in accordance with a third aspect of the present invention.

FIG. 6 is a flow chart depicting a secure process for distributing video on-demand content via a cable distribution network in accordance with a third aspect of the present invention. The process depicted in FIG. 6 may be called a pass-through process.

First, a video program is encrypted 602 by a video on-demand source 402 to generate an encrypted program in a first encrypted form. The encrypted program is transported 604 via a primary distribution network from the video on-demand source 402 to a remote server 404 within a distribution center 106. A key to decrypt the encrypted program may also be transported from the source 402 to the server 404. The encrypted program is then stored 606 in the remote server 404.

The key may be a public key of a public key encryption system. Such a public key encryption system uses two different key: a public key to encrypt data and a private key to decrypt data. In that case, decryption would be accomplished using a corresponding private key of the public key encryption system. Examples of such a public key encryption system are encryption under the PGP (Pretty Good Privacy) system or under the RSA (Rivest, Shamir, and Adleman) system. Alternatively, the key may be a private key of a private key encryption system. Such a private key encryption system uses a single private key to encrypt and decrypt data. Examples of such a private key encryption system are encryption under the Data Encryption Standard (DES) or under triple-DES which involves applying DES three times to enhance security. The private key(s) itself may be transmitted from the source 402 to the server 404 while encrypted in a second encrypted form. Alternatively, the private key(s) may be transported from the source 402 to the server 404 via a communication channel which is separate from the communication channel used to transport the video program from the source 402 to the server 404.

Subsequently, when the remote server 404 receives 608 a request for transmission of the video program from a subscriber station 110, the remote server 404 responds by multiplexing 610 the encrypted program in the first encrypted form (and the key if necessary) with other signals to generate a multiplexed signal. The multiplexed signal is then distributed 612 via the secondary distribution network 108 to the requesting subscriber station 110.

At the subscriber stations 110, the multiplexed signal is demultiplexed 614 to isolate the encrypted program in the first encrypted form (and the key if necessary), the encrypted program is decrypted 616 from the first encrypted form to generate the unencrypted video program, and then the video program is displayed 618, typically, on a television monitor connected to set-top box.

Figure 7:
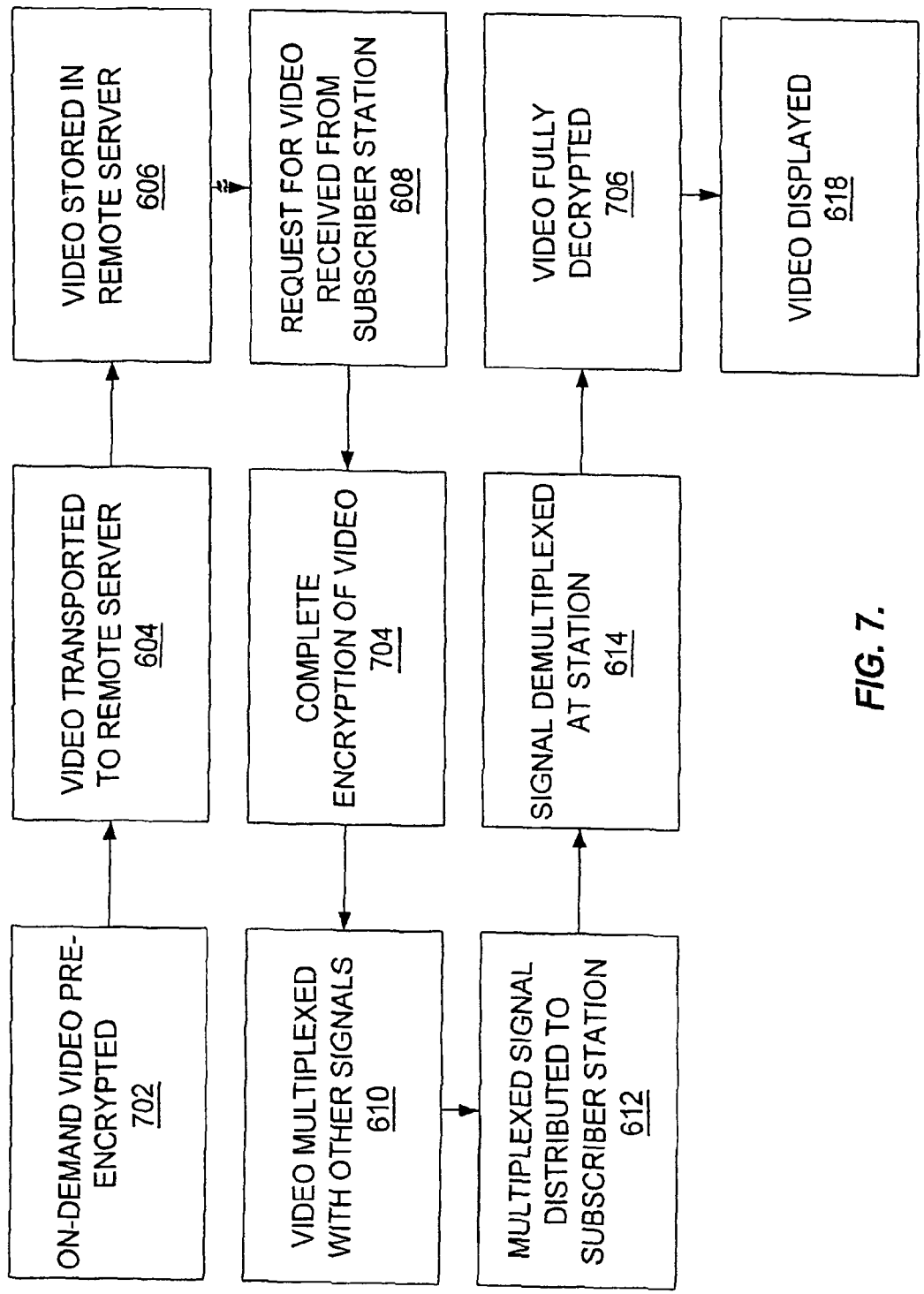
FIG. 7 is a flow chart depicting a secure process for distributing video on-demand content via a cable distribution network in accordance with a fourth aspect of the present invention.

FIG. 7 is a flow chart depicting a secure process for distributing video on-demand content via a cable distribution network in accordance with a fourth aspect of the present invention. The process depicted in FIG. 7 may be called a multiple-layer encryption process. In comparison with the process in FIG. 6, the process in FIG. 7 pre-encrypts 702 the video program at the source 402, completes encryption 704 of the video program at the remote server 404, and fully decrypts 706 the video program at the subscriber station 110.

The pre-encryption step 702 may be implemented by applying a single DES encryption or a double DES encryption. If the pre-encryption step 702 uses a single DES encryption, then the completion of encryption step 704 may be implemented by applying a double DES encryption to achieve triple-DES encryption. Similarly, if the pre-encryption step 702 uses a double DES encryption, then the completion of encryption step 704 may be implemented by applying a single DES encryption to achieve triple-DES encryption. In either case, the video program is transported from the remote server 404 to the subscriber station 110 while under triple-DES encryption. As long as the subscriber station has the three keys required, it will be able to fully decrypt 706 the triple-DES encryption to obtain the unencrypted video program.

It is to be understood that the specific mechanisms and techniques which have been described are merely illustrative of one application of the principles of the invention. For example, while the present invention is described in application to video on-demand, it also has some application in broadcast video. Numerous additional modifications may be made to the methods and apparatus described without departing from the true spirit of the invention.

We claim:

1. A method, comprising:
processing, by a remote server of a distribution center of a content provider, a video program encrypted in a first encrypted form received from at least one programming source to produce a modified version of the video program;
processing, by the remote server, the modified version of the video program to produce a video program in a second encrypted form;
receiving, by the remote server, a user request for the video program; and
as a response to the user request, transmitting, by the remote server, the video program in the second encrypted form to a user device using a portion of a distribution network of the content provider.

2. The method of claim 1, wherein the video program encrypted in the first encrypted form is a video-on demand program encrypted in the first encrypted form, the user request is requesting the video-on demand program, and the distribution center is located at a location of the content provider.

3. The method of claim 1, further comprising: transmitting a decryption key to the user device, the decryption key being necessary to decrypt the video program in the second encrypted form.

4. The method of claim 3, wherein the decryption key and the video program in the second encrypted form are transmitted to the user device separately.

5. The method of claim 1, wherein the at least one programming source includes one or more of the following: a broadcast source, a premium broadcast source, or a video-on-demand source.

6. The method of claim 1, wherein transmitting the video program in the second encrypted form to the user device uses a first communications channel of the distribution network; and the method further comprises:
transmitting a decryption key to the user device using a second communications channel of the distribution network.

7. The method of claim 1, wherein the video program in the second encrypted form is encrypted according to a Data Encryption Standard (DES).

8. The method of claim 1, wherein the video program in the second encrypted form is multiplexed with other signals to create a multiplexed signal for transmission to the user device.

9. A system, comprising:
a distribution center of a content provider comprising a remote server, the remote server configured to:
process a video program encrypted in a first encrypted form received from at least one programming source to produce a modified version of the video program,
process the modified version of the video program to produce a video program in a second encrypted form,
receive a user request for the video program, and
as a response to the user request, transmit the video program in the second encrypted form to a user device using a portion of a distribution network of the content provider.

10. The system of claim 9, wherein the video program encrypted in the first encrypted form is a video-on demand program encrypted in the first encrypted form, the user request is requesting the video-on demand program, and the distribution center is located at a location of the content provider.

11. The system of claim 9, wherein the remote server is configured to cause transmission of a decryption key to the user device, the decryption key being necessary to decrypt the video program in the second encrypted form.

12. The system of claim 11, wherein the decryption key and the video program in the second encrypted form are transmitted to the user device separately.

13. The system of claim 9, wherein the at least one programming source includes one or more of the following: a broadcast source, a premium broadcast source, or a video-on-demand source.

14. The system of claim 9, wherein the video program in the second encrypted form is transmitted to the user device using a first communications channel of the distribution network; and the remote server is configured to:
   transmit a decryption key to the user device using a second communications channel of the distribution network.

15. The system of claim 9, wherein the video program in the second encrypted form is encrypted according to a Data Encryption Standard (DES).

16. The system of claim 9, wherein remote server is configured to multiplex the video program in the second encrypted form with other signals to create a multiplexed signal for transmission to the user device.

17. A method, comprising:
   processing, by a remote server of a distribution center of a content provider, a video program encrypted in a first encrypted form received from at least one programming source to produce a modified version of the video program;
   processing, by the remote server, the modified version of the video program to produce a video program in a second encrypted form;
   receiving, by the remote server, a user request; and
   as a response to the user request, transmitting, by the remote server, the video program in the second encrypted form to a user device using one of the content provider's distribution networks.

18. The method of claim 17, wherein the video program encrypted in the first encrypted form is a video-on demand program encrypted in the first encrypted form, the user request is requesting the video-on demand program, and the distribution center is located at a location of the content provider.

19. The method of claim 17, wherein the at least one programming source includes one or more of the following: a broadcast source, a premium broadcast source, and a video-on-demand source.

20. A system, comprising:
   a distribution center of a content provider comprising a remote server, the remote server configured to:
      process a video program encrypted in a first encrypted form received from at least one programming source to produce a modified version of the video program,
      process the modified version of the video program to produce a video program in a second encrypted form,
      receive a user request for the video program, and
      as a response to the user request, transmit the video program in the second encrypted form to a user device using one of the content provider's distribution networks.

\* \* \* \* \*